United States Patent

Quame

[15] 3,649,292

[45] Mar. 14, 1972

[54] RECOVERY OF PRODUCTS FROM PLANTAIN WASTES IN GHANA

[72] Inventor: Babington A. Quame, 235 East 18th St., New York, N.Y. 10003

[22] Filed: Oct. 24, 1968

[21] Appl. No.: 770,333

[52] U.S. Cl. ...........................................99/4, 99/9, 99/93, 99/132, 71/11, 71/25, 195/10, 201/25
[51] Int. Cl. .................................................A23k 1/18
[58] Field of Search.....................99/4, 9, 10, 2, 93; 127/37; 195/7-10, 33

[56] References Cited

UNITED STATES PATENTS 620,209    2/1899    Zürcher,........................................99/2

OTHER PUBLICATIONS

Chemical Abstracts, Vol. 26, 3322 (b), V. N. Gokhale, 1932.
Chemical Abstracts, Vol. 58, 14627 (f), A. R. Rahman, 1962.
Chemical Abstracts, Vol. 59, 9129 (a), A. R. Rahman, 1963.
Chemical Abstracts, Vol. 64, 8277 (d), A. G. Gorin, 1966.

*Primary Examiner*—Norman Yudkoff
*Assistant Examiner*—Kenneth Van Wyck
*Attorney*—Harold D. Steinberg and Martin Blake

[57] ABSTRACT

The invention relates to an overall method of producing valuable products from plantain so that material which normally constitutes a considerable amount of waste is put to economic utility. According to the invention there is obtained from what was hitherto waste a series of valuable products, including fiber, amorphous carbon, inorganic salts, an edible flour and a powder that can be used either as poultry feed or as fertilizer.

1 Claim, 1 Drawing Figure

PATENTED MAR 14 1972 3,649,292
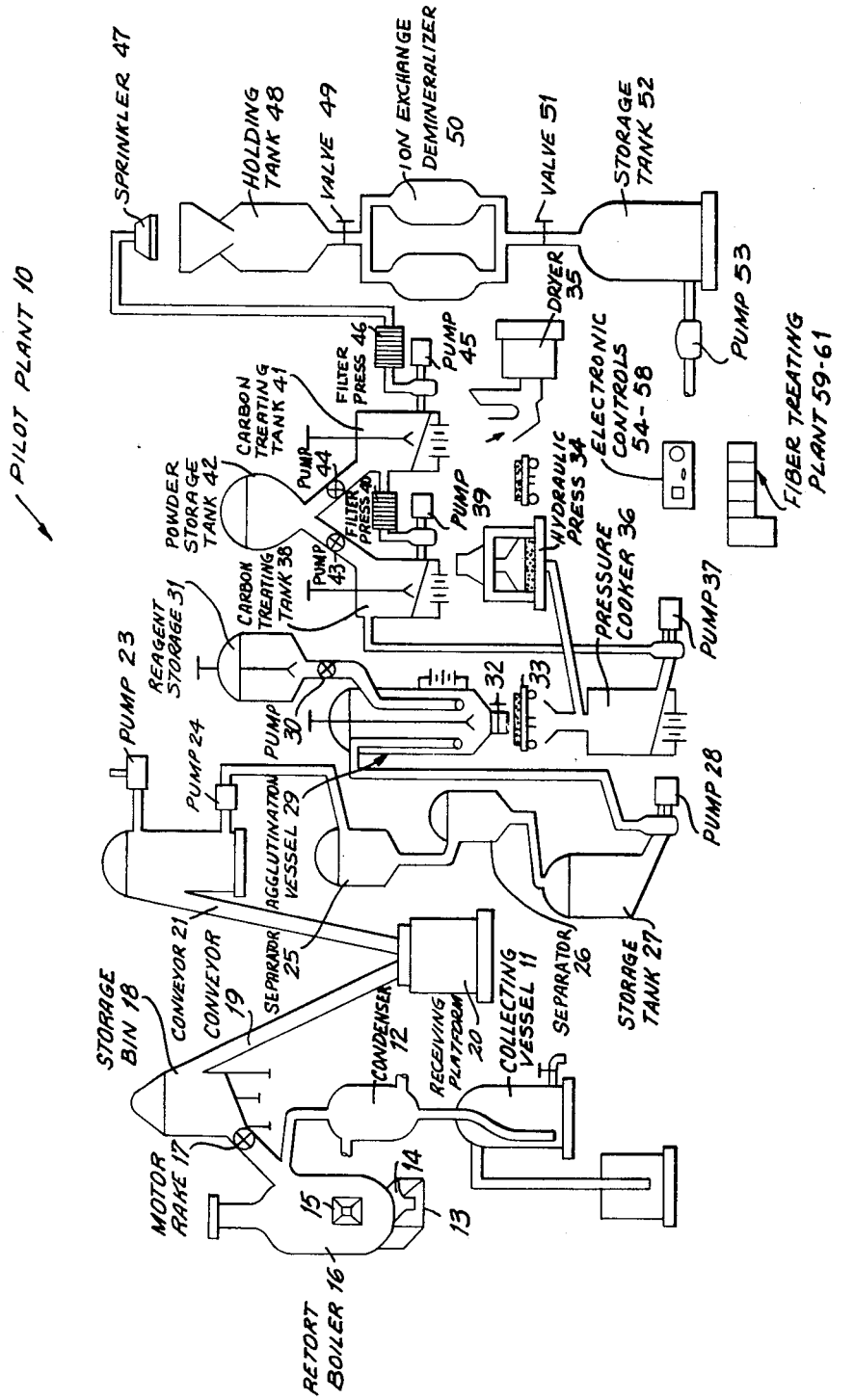
INVENTOR.
BABINGTON A. QUAME
BY
Steinberg and Blake
ATTORNEYS

RECOVERY OF PRODUCTS FROM PLANTAIN WASTES IN GHANA

This investigation relates to plantain and plantain wastes in Ghana, and more particularly to the recovery of an edible flour, a sugar base for concentrates, poultry feed, fertilizers, cellulose, and organic and inorganic salts and their their allied products.

It is the object of the present investigation to assess plantain and plantain wastes, and to obtain a quantitative evaluation of their principal ingredients in order to determine their suitability as a new source of raw materials. This is based upon a practical consideration of the large volume of waste of this tropical, treelike herb known as plantago (Musa paradisiaca), and commonly referred to as the plantain. In Ghana, plantain grows wild in the bush, and is also cultivated on farms and in gardens. The name "plantain" varies from tribe to tribe and from country to country, but its basic ingredients and uses are the same. Plantain is easily cultivated; it requires 15 to 18 months to reach the cutting stage, when it bears an average vegetable bunch weighing 50 pounds. After harvesting, only 40 pounds of the edible fruit of the plant are considered useful. The leaves, the porous sheaths of the trunk, the stock and the vegetable peels, weighing from 500 to 1,000 pounds for each plant, are left in place to waste. Plantain must be cooked to be edible; the usual method is boiling in water for several minutes. This process, however, removes protein and sugar, which go into solution. This solution is usually discarded, but here it was added to the other waste materials and processed for recovery.

Other useful plantain wastes are the leaves, the peels and the fibers.

A bast fiber obtained from plantain shows no marked chemical difference in reaction from other plant fibers called "Abaca fiber," which also belongs to the plantain family. Plantain fiber is comparatively simple in its structure. Under the microscope, several small bunches of single, elongated central canal fibers are cemented together. When the fiber is properly treated in alkaline solutions, it is freed from porous, pectinlike impurities. In this study, two types of fibers are taken from the plantain: a fiber obtained from the porous sheath trunk and a fiber extracted from the stock of the fruit. These raw materials are fermented; after being beaten and retted to a finer texture, the crude fiber is washed and treated in alkaline and acid solutions to give it a conventional bleached finish. This process yields a white fiber. A fiber obtained from the trunk seems to turn brown in the process of oxidation because of the large deposit of tannic acid materials. Such fiber dyes easily. When a white fiber is treated with iodine and sulphuric acid, followed by glycerin, it becomes yellow. Also, a purified white plantain fiber absorbs or takes up colors easily. It is also noted that such fiber is not affected or weakened by the use of alkali or acid soaps. A purified plantain fiber is soluble in the conventional ammoniacal cupric oxide solution, or Schwetzer's reagent, in acetic anhydride in the presence of sulphuric acid, and in sodium hydroxide in the presence of carbon bisulfite.

Dry, destructive steam distillation of plantain wastes, namely, the leaves, the peels, and the porous sheaths of the trunk was also carried out. When these are heated in a retort boiler, various volatile materials are given off. The volatile gas was condensed into liquid and collected in a vessel; when analyzed, the liquid was found to consist of styptic substances used in medicine and in industry. A decomposed material of the amorphous carbon which remains was ashed in a conventional Muffer Furnace at a high temperature. Water-soluble inorganic salts were obtained which consist of suitable salts for the manufacture of perfumed soaps as well as for other industrial uses.

When 500 grams of plantain vegetable was milled and liquefied in 1 gallon of warm distilled water, a recovery of meal was obtained. This meal, when pressed into cakes and dried in a germ-free, glass-roofed house, ground, and sieved, yielded 435 to 445 grams of edible flour. This recovery of flour from the meal depends upon the temperature of the distilled water (from lukewarm to near boiling) and represents 87 to 89 percent by weight. This flour, which resembles whole wheat flour and its products, contains 2.5 percent of nitrogen or 15.625 percent of protein, and consists chiefly of the starch portion of plantain meal. Under a microscope, the starch shows characteristic aggregations of large, lenticular grains. Small grains are rare. The lenticular grains are more or less sickle-circular in shape, while the small grains are usually globular and polygonal in outline. The size of the starch grain varies in diameter. At the center of the grain, usually as a mere dot, is the hilum; no play of colors is evident when the grain is stained. Thus the physical appearance of plantain starch under the microscope resembles that of wheat. Plantain starch is usually regarded as a reserve material, but its function is quite different from that of starch stored up in other plants. Plantain starch is not utilized by the young plantlet, but like the starch of green plants is gradually converted into sugars. Therefore, investigations for sugar were made in the filtrate which had been collected from the liquefied fruit. This grayish or cloudy filtrate has a pH of 5.6. The filtrate being sour, development of chromatographic methods for the purification and identification of toxic substances were initiated. Besides nontoxic or nonpathogenic micro-organisms, the filtrate contains starch, traces of minerals, molds and proteins.

Since the protein is extremely sensitive and easily undergoes physical changes, the process of denaturation is easily effected. This reaction depends upon heat or other factors acting upon the protein as solvents. Thus, when the vegetable is cooked, most of the essential nutriments of plantain go into water solution. As a cooked food, it is one of the chief articles of staple diets in Ghana. Cooking of the plantain vegetable in Ghana produces over 1 million gallons of grayish, or proteinized, water solution per day, which contains about 44 tons of soluble extracts. This large amount of juice with rich extractive proteins has always been rejected as useless, whenever the plantain vegetable is cooked.

In this investigation, the pH of the grayish juice was adjusted either to pH 2.5 with 50 percent solution of sulphuric acid as a preservative, or to pH 7.0 by the addition of calcium carbonate or calcium hydroxide, or a mixture of both of these. The latter not only neutralizes the protein water solution, but also precipitates a mixture of calcium and albumin as calcium pectate gel. This calcium pectate gel was separated, pressed, dried, and ground to a fine powder. When analyzed, it was found to contain sufficient albumin; the process yields a recovery of 15 grams, or 3 percent of this protein, which can be used for poultry feed or fertilizer.

Quantitative analysis and qualitative chromatograms of the free soluble sugars in the filtrate of the grayish water juice from plantain show that the major sugar is glucose. A recovery of 40 grams, or 8 percent of this soluble solid, was obtained when 500 grams of plantain were milled in lukewarm water. When the same amount of plantain vegetable was brought to near boiling, a recovery of 50 grams of soluble solid, or 10 percent, was obtained. Thus the proteinized water juice of the plantain was found to be a new source of raw material that gives the fermentation of sugar a new economic importance.

In a typical process, a Biological fermentation proceeds under the influence of enzymatic protein with the accessory of nonproteinoid substances. The latter acts as a coenzyme, an activator which combines the organic molecules for fermentation. It has been noted that the grayish juice, which has always been rejected after cooking the vegetable in Ghana, contains complex inorganic salts such as phosphates, sulphates, chlorides of potassium, sodium, magnesium, calcium and iron. Traces of most of these inorganic salts are found to exist in the combination of enzymatic organic molecules. It has also been observed that when a milky juice from a boiled plantain is left to itself at pH 5.6, with or without free oxygen, at room temperature, it begins to ferment. Fermentation takes place spontaneously as a result of the growth of the micro-organisms naturally present in the juice. It is also observed that by pitching the unfermented juice with some previously fermented must, it grows quite turbid. Bubbles of gas rise to the surface while the temperature rises. The viscosity and specific gravity decrease. As its sweet taste gradually changes into a distinct flavor, an alcoholic aroma develops. Toward the end of the fermentation the turbidity gradually disappears. Complete fermentation leaves a young beverage in a crystal-clear state over molds and heavy sediment at the bottom. Investigation of the molds and sediment reveals the presence of nonpathogenic *crytococcus laurentli*, *candida krusei*, *penicillium*, *paelilomyces* and *auriobasidium pullvans*. In the isolation of these micro-organisms, media enriched with some growth factors were employed. Cryptococcus laurentli were found to assimilate glucose, maltose, sucrose, lactose and galactose. On the other hand, all the *candida krusei* strains, when grown in fermentation media under semianaerobic conditions, ferment only glucose. The optimum temperature is between 25° and 37° centigrade.

In order to minimize the use of acid and the neutralizing effect, the pH of plantain protein solution was investigated. The average pH of the cooked and uncooked plantain vegetable solution was found to be between 5.3 and 5.6. Thus the addition of a small amount of calcium hydroxide or calcium carbonate, or a mixture of these, neutralizes a milky or cloudy juice to pH 7.0. When the filtrate is boiled under high pressure, as in commercial sterilization, a light, yellow-to-amber solution of pH 6.5 without micro-organisms is obtained. Decolorizing this amber solution with activated carbon removed objectionable organic substances, taste, odor, and natural corrosiveness. Such a solution has a concentration of 1.0 to 1.5 percent of sugar, depending upon the temperature of denaturation.

A clear solution of pH 6.0 to 6.2 is obtained and passed through ion exchange resins. The final treatment produces a pleasing, tart-tasting juice at a pH of 4.2. This ion exchange treatment consists of the passing of a diluted and neutralized solution made up to a gallon (obtained from 500 grams of plantain vegetable) through the exchange columns until the desired pH is reached. The complete removal of the natural corrosiveness of plantain juice is accomplished in the ion exchange operation because of the neutralizing effect of the calcium. Such purified plantain juice meets the commercial requirements for a sugar water pack which is used for concentrates and allied products. When one gallon of the above solution is evaporated to a volume of 400 millimeters, or 1/10 of a gallon, a 10 to 15 percent sugar solution is obtained when the vegetable is brought to near boiling. When the latter volume is evaporated to a high concentration in a steam bath and crystallized, 40 or 50 grams of solid sugar is obtained. Alcohols or beverages made from such a sugar water solution have a high degree of palatability and foam stability, and their brilliancy is not affected by low or high temperatures.

Thus, up to this point, it was noted that by boiling 1 ton of plantain vegetable from lukewarm to near boiling, in 1,816 gallons of distilled water, the following products were discovered:

| Description of product | Recovery | | | |
|---|---|---|---|---|
| | Weight in pounds | | Percent | |
| | Luke-warm | Boiled | Luke-warm | Boiled |
| Refined flour containing 15.6% protein | 1,780 | 1,740 | 89.0 | 87.0 |
| Soluble extract (sugar) | 160 | 200 | 8.0 | 10.0 |
| Poultry feed and fertilizers | 60 | 60 | 3.0 | 3.0 |
| Total | 2,000 | 2,000 | 100.0 | 100.0 |

Besides these products, 348 pounds of dried waste plantain peels were obtained from processing 1 ton of plantain vegetable fruits. When these waste peels were retorted and ashed in a boiler, the following products were recovered:

| Description of product | Recovery | |
|---|---|---|
| | Weight in pounds | Percent |
| Organic salts | 333.0 | 95.7 |
| Inorganic salt (ash) | 15.0 | 4.3 |
| Total | 348.0 | 100.0 |

From these assessed laboratory observations, it is noted that processing about 10,000 tons of plantain vegetable would produce from 8,700 to 8,900 tons of refined flour; 300 tons of poultry feed; from 800 to 1,000 tons of sugar; 75 tons of inorganic salts and 1,664.5 tons of inorganic salts.

Considering these findings, estimated costs indicated that the process would be profitable considering the profuse supply of plantain and its large waste volume. Capital investment, including equipment, installation, and buildings (including a steam-operated fiber treating plant) would be about $1,000,000 for a plant capable of processing plantain and plantain wastes at the rate of 4 to 5 tons per hour. Capital depreciation at 2 percent annually would amount to $5 per ton when 4,000 tons are processed annually. Labor is estimated at $10.17 per ton, when supply is available at the rate of 4 tons per hour. Of this, about $3.17 would be for operation of the juice press. The cost of materials, which is relatively independent of volume, would be about $25.83 per ton, and half of this would be for decolorizing carbon. The total cost of $41.00 per ton would be substantially less as the volume increased to 5 tons per hour and 10,000 tons per year.

Based on a recovery of 1 ton of plantain vegetable, the price of a refined flour can be estimated arbitrarily at 4 cents per pound, while that of a refined wheat flour costs about 8 cents per pound. This proteinized plantain flour is economically feasible for the production of bread, rolls, cookies, cereals, biscuits, cakes, doughnuts, puddings, grists for instant "Fufu" mix, and other products. The poultry feed would cost about 1 cent per pound, and the organic salts or acids, would cost 0.02 cent per pound, for the manufacture of drugs and other products. On the other hand, the inorganic salts, at a cost of 1 cent per pound, would be used for the manufacture of perfumed soaps and similar products. Finally, the soluble solid, consisting of sugar, would cost 3 cents per pound for manufacturing its allied products. From such arbitrary prices a profit can be estimated from the total cost of $41.00 per ton from the following estimated prices of plantain and plantain waste products:

| Description of product | Recovery from plantain and plantain wastes | | | | |
|---|---|---|---|---|---|
| | Total weight in pounds | | Arbitrary price per pound | Estimated price | |
| Refined flour | 1,780 | 1,740 | 4 cents | 69.60 | 71.20 |
| Soluble extract (sugar) | 160 | 200 | 3 cents | 6.00 | 4.80 |
| Poultry feed | 60 | 60 | 1 cent | 0.60 | 0.60 |
| Organic salt or acid | 333 | 333 | 2 cents | 6.65 | 6.65 |
| Inorganic salts | 15 | 15 | 1 cent | 0.15 | 0.15 |
| Total | 2,348 | 2,348 | | 83.00 | 85.40 |

Assuming that these figures are acceptable, a profit of $42.00 to $44.40 per ton would be possible. Also, if these figures are acceptable, pound for pound, to take the place of refined sugar, the savings can be estimated from the cost of the sugar cane refinery (Ghana Today, Vol. 12, No. 12, of Wednesday, June 12, 1968), which estimates 9,000 tons at NC1,170,000. This costs 7.2 cents per pound while plantain would cost 3 cents per pound. This would result in a saving of $84.00 per ton, or $67,000 to $84,000 annually, when 10,000 tons of plantain are processed at the rate of 5 tons per hour. This total volume of 10,000 tons of plantain represents what Ghana consumes every 9 to 10 days; and each day, about 1 million gallons of boiled plantain juice are produced. This juice (which contains about 44 tons of soluble extracts) is discarded each day as useless. Yet this soluble extract can produce jams, jellies, baby foods, confections, desserts, and, above all, beverages.

Speaking of beverages, Ghana, with a population of 7,945,000, consumes between 10 to 11 million gallons of beer per year. The present shortage of facilities for beer production and the beer consumption in Ghana results in an inflated price of 63 cents, or 45 pesewas, per 24 fluid ounces, or $3.50 per gallon of beer. It is estimated that 800 to 1,000 tons of refined sugar from plantain vegetable alone would produce in Ghana between 2 to 3 million gallons of beer per year, and this amount can be increased if it is desired. Because of the present shortage and inflation, the price of beer in that country amounts to between $7,000,000 and $10,000,000 per year for 2 to 3 million gallons.

Paradoxically, it is noted on pages 38-39 of "Ghana Economy and Aid Requirements in 1967" that minimum imports from 1965 to 1967 are estimated as follows:

| Customs item | Commodity description | Imports N¢ 1967 | Imports N¢ 1965 |
| --- | --- | --- | --- |
| 064 | Flour | 8,167,000 | 3,500,000 |
| 054 | Hops and malt (for local brewery) | 750,000 | 664,000 |
| 061 | Sugar | 6,750,000 | 5,167,000 |
| 081 | Animal feed (mainly for poultry) | 1,200,000 | 1,000,000 |
| 112 | Concentrates for manufacture of alcoholic and nonalcoholic beverages. | 1,417,000 | 690,000 |
| 561 | Fertilizers | 667,000 | 325,000 |
|  | Total | 18,951,000 | 11,346,000 |

From the information given in the preceding Table it can be observed that the production of plantain products is financially feasible. Under these conditions, it is a still further object of the present investigation to provide an efficient method of processing in order to obtain plantain flour, sugar concentrates, cellulose, poultry feed, fertilizers, and organic and inorganic salts from a single source of raw material. Since plantain is profusely available and its waste is very large, it is intended to provide profitable uses for these wastes.

Yet another objective of the present investigation is to provide the recovery of products from plantain wastes which can be produced, manufactured, packaged, and sold in large quantities at a comparatively low cost, and which can be utilized conveniently wherever needed.

Still other objectives, benefits, and advantages of this investigation will become evident from a study of the following detailed description of the operations performed in conjunction with this work, in which:

The figure is a diagrammatic illustration of a pilot plant which can be used for the recovery of products from plantain and plantain wastes in accordance with the present invention.

Referring now specifically to the drawing, a pilot plant 10 for the recovery of products from plantain and plantain wastes consists of a systematic arrangement and combination of conventional equipment and tools which are electronically controlled by members 54-58. A conventional retort boiler 16 for the dry, destructive distillation is constructed of bricks or steel, or both of these materials. It is equipped with a collecting vessel 11, and a condenser 12, a base 13, a funnel 14, a lug door 15, and heaters. Member 16 receives a mass from a storage waste bin 18. This mass is supplied and regulated through a conventional rotary motor rake 17 which is held in a chute of the storage waste bin 18. A mass that is raked into the retort boiler 16 is heated with an opening, through a water-cooling condenser 12, only sufficient to permit the escape of volatile material from what is being heated, to condense into a collecting vessel 11. A decomposed material of amorphous carbon, which remains in the retort boiler 16, is removed at the base 13 through a funnel 14 and a lug door 15.

A storage waste bin 18, which is supported by legs, is constructed of aluminum sheets, concrete cement, or wood. This waste storage bin is equipped with a discharge slope chute which extends from its bottom into the retort boiler 16. This discharge slope chute is provided with a device 17 which regulates the supply of mass from the waste storage bin 18 feeding into the retort boiler 16. A conventional conveyor, elevator 19, is also constructed from the upper end of the storage waste bin 18 and leads to a separate section of a receiving platform 20.

A receiving platform 20 consists of a waste material section and another section for the important step of thoroughly cleaning the raw vegetable. Here, especially designed, conventional vegetable washers are located. The raw food material is subjected to high-pressure sprays or streams of potable water while passing along a moving belt or while being tumbled on agitating or revolving screens.

From this vegetable receiving platform 20 another conveyor elevator 21 leads into a conventional mill 22. Member 22 consists of a heavy-duty Waring blender, which contains a motorized base of cast iron which is fan-cooled, and permanently lubricated bearings. It is equipped with a heavy-duty, continuous series-wound motor, and a stainless steel blending container. This blending container is mounted at the bottom of the unit. The blending container is constructed of four lobed cross sections to produce forceful flow of the material into the rotating blades (actually, a one-piece stainless steel cutting propeller with four blades). The propeller engages the motor spindle without clamping when the blending container is placed on the motorized base. This base is provided with push-button controls for several speeds as well as an "OFF" button.

At the upper end of the blending container two holes are drilled, one of which is larger and opposite the other. A third hole is drilled a few inches above the bottom of the blending container. A small hole at the upper end of the blending container is fitted with a pipe. This pipe leads into an outlet of a heavy-duty delivery pump 23, while the inlet of this pump is connected to an incoming warm water pipe.

This conventional delivery pump 23 consists of a bronze case equipped with a stainless steel shaft with bronze sleeve bearings and impeller. The impeller is constructed of non-clogging iron for solids and trash. The delivery pump is equipped with a single-phase motor provided with an automatic pressure control set to 50 pounds which is prewired to the motor pressure regulating valve to prevent burn-out. It operates on 115/230 volts, 50/60 cycles AC to deliver a large number of gallons per hour.

The large hole in the blending container also accommodates the output of the conveyor elevator 21. A third hole a few inches above the bottom of the blending container is connected with a pipe leading into an input of a conventional centrifuge pump 24. This pump consists of a bronze case equipped with a stainless steel shaft, with bronze sleeve bearings, and an impeller. The impeller in 24 is identical to the impeller in 23. The output of member 24 leads into the top side of a separator 25.

Member 25 consists of a utility tank with a cover; a seamless deep-drawn stainless steel funnel; and a 28-mesh wire gauze fitted on a frame with a handle. This unit separator 25 is constructed by welding crossbars to an inner lip-opening at the bottom of the utility tank. At the same end, the funnel is welded to the utility tank. A 28-mesh wire gauze to fit the diameter of the utility tank is held at the bottom of a canister frame. The frame is provided with a handle for easy placing and removing of the 28-mesh wire gauze canister. Completing this unit, a pipe is connected to the lower end of the stem of the funnel. This pipe is joined to the upper side of a second separator 26. This member is identical to member 25, with the substitution of 38 for 28-mesh wire gauze. At the lower end of the stem of the funnel a pipe is connected and joined into a storage tank 27 in a cold room.

This conventional storage tank 27 is constructed of galvanized steel and is lined with a layer of fiberglass. It is equipped with a built-in anode rod to give extra protection against rust and corrosion. By benefit of electrolysis, member 27 keeps the solutions free of impurities. It is provided with inlet and outlet nozzles and finished with a baked-on white enamel. The outlet of this member 27 is connected to a pipe which leads into an inlet of a conventional booster pump 28.

Member 28 has a bronze body equipped with a stainless steel shaft, bronze sleeve-bearings, and an impeller of wear-resistant iron for solids and trash. It consists of a single-phase motor having an automatic switch set to a discharge pressure of 20 to 50 pounds per square inch. This automatic pressure switch is wired to a motor-pressure regulating valve to prevent burn-out. As a self-priming pump, it operates on 115/230 volts 50/60 cycles AC to deliver a large number of gallons per hour of continuous service. The outlet of this member 28 is connected to an inlet of agglutination vessel 29.

Member 29 consists of an extra heavy duty stainless steel utility tank with cover, a seamless, deep-drawn construction of a stainless steel funnel, a heating mantle for the funnel, and a conventional heavy-duty stirrer with built-in support clamps. The agglutination vessel is constructed by removing the bottom of an extra heavy duty stainless steel utility tank. In place of the bottom (which has been removed) a stainless steel funnel is connected to the utility tank and welded to form one piece. A heating mantle for the funnel and the tank is provided. A heavy-duty utility stirrer with rheostat control is suspended in the utility tank by supports attached to the tank. A large opening at the upper end of the tank is drilled, and a small hole opposite it. A pipe is fitted in the small hole to connect an outlet of a booster pump 28, and the other hole connects a pipe to the output of member 30. The input of member 30 connects a pipe which leads into the outlet of a reagent storage tank 31.

The reagent tank 31 consists of a stainless steel utility tank with cover, a conventional utility stirrer, and a dispensing motor pump 30. Member 30 is identical to member 24 except that is is pre-wired to an interval timer. Member 31 is constructed by drilling a hole or holes at the upper cover of the tank to hold and support the utility stirrer for suspension in the tank. Another hole is drilled at the bottom of the utility tank 31. A pipe is held into this hole and connected into an input of member 30. The output of member 30 leads into an agglutination vessel 29. At the lower opening of member 29, a water needle valve 32 is connected to deliver directly below into a conventional rack-and-cloth equipment 33.

Member 33 consists of wire gauze drainage plates, metal frame filter cloths, and a push truck provided with a cage and a central drainage pipe under a push truck. The wire gauze drainage plates and the metal frame filter cloths are held in the cage provided for the push truck. With the drainage plates and the metal frame filter cloths held in the cage of the push truck, the equipment drains only through the central pipe beneath the push truck. The combination of these units forms the rack-and-cloth equipment 33 which is also part of a conventional hydraulic press 34.

Member 34 consists of a hydraulic system, ram and two platens with adjustable surface opening, mounted on a sturdy cast base with threaded columns, hand pump, and pressure gauge. Pressure can be built up quickly by means of a short lever on the pump. An extension lever is provided to obtain high pressures. The gauge is equipped with black and red hands; the black hand is for direct reading of the force applied, and the red hand is for maximum pressure obtained. The platens contain a drainage groove for pressing out liquids. It is provided with plate-and-cloth equipment for pressing materials. The pressed material is transferred into a glass-roofed room for drying, or is kept in a conventional dryer-furnace 35, at a lukewarm temperature, overnight.

A dryer-furance 35 consists of a furnace designed to meet general laboratory requirements such as the drying of precipitates, ash determinations, enameling, heat-treating and experimental testing by the selection of the constant temperature desired. It consists of heating units, mounted on the side of a heating chamber, which are easily replaceable. They are the standard multiple-unit type consisting of coiled wires of high-grade nickel-chromium. The wires are wound between undercut grooves of refractory plates. The dryer-furnace is equipped with a 36-step tap changing transformer, pyrometer indicator, "ON-OFF" switch, and neon pilot light mounted on a pyramid-type base panel. A high-speed direct drive centrifugal fan circulates air, and a heat-resistant alloy baffle directs its flow, assuring rapid and uniform heating. A variable temperature regulation permits the holding of a constant temperature regardless of normal fluctuations in line voltage. It is provided with shelves for the drying of precipitates, and operates on a 115/230 volt, 50/60 cycles AC at a maximum temperature of from 50° to 1,150° centigrade, consuming 1,150 watts.

Directly below the rack-and-cloth equipment 33 a pipe leads into a pressure-cooking vessel 36. This unit consists of an electric water heater constructed from a galvanized steel tank, with an inner layer of fiberglass insulation. It is equipped with upper and lower extended-life dual heating elements of high wattage for quick sterilization under high pressure. It is provided with adjustable thermostat, a relief safety valve, and has a working pressure of 150 pounds per square inch. It operates on 115/230 volts 50/60 cycles AC. An outlet of this member 36 is connected to an inlet of a conventional booster pump 37.

This booster pump 37, which is constructed with a bronze body, is identical to the motor of member 28. The outlet of this member is connected to an inlet of a carbon-treating tank 38.

Member 38 consists of an extra heavy duty stainless steel utility tank, a heavy-duty hot plate, and utility stirrer. An extra heavy duty utility tank having a permanently bonded aluminum alloy bottom for fast and more even transfer of heat is held directly on top of a conventional hot plate. This hot plate consists of a base, insulated removable heating units, and a metal top plate. It is provided with a high-temperature control, and has insulation formed from slabs of material of very low thermal conductivity. There are two or four units in each plate of a molded refractory material grooved to receive heating coils. Coils are exposed and radiate directly to a metal top plate. The top plate is made of heat resistant metal coated with aluminum paint to prevent rusting. The base is constructed of reinforced steel, and operates on 115/230 volts 50/60 cycles AC. Two holes are drilled in the upper side of the tank, and one at the lower end. Leakproof pipes are connected into each of the drilled holes. The upper side pipe connects the output of a booster pump 37. A utility stirrer with rheostat control is suspended in the utility tank by supports attached to the tank. At the other, upper end of the tank 38 a pipe is joined to connect members 42 and 43, while a pipe at the lower end of the tank is joined to an inlet of a conventional booster pump 39.

This booster pump 39 is identical to the motor of member 28. The outlet of this member 39 is connected to an inlet of a conventional filter press 40.

Member 40 consists of a round pattern of iron for rapid filtration of a large volume of mixture under high pressure, up to 150 pounds per square inch. It is equipped with plates and frames. The plates consist of two heads and two filters. The plates and the filters are held in place by a handwheel which loosens easily for removal of the plates and filters as well as disposal of residue at the base of the filter press. Three extension frames are also supported on a funnel-shaped reservoir base. The filter press is equipped with brass valves, brass discharge corks, a pressure gauge and a siphon. Pipes are connected to the brass discharge corks which connect with an inlet of a carbon treating tank 41.

Member 41 is identical in construction to that of member 38. One of the pipe holes at the upper end of the carbon treating tank 41 connects member 44 to a powder storage tank 42.

A powder storage tank 42 consists of a stainless steel utility tank with cover A deep-drawn stainless steel funnel with a three-way connector, and powder-dispensing motor pumps 43 and 44. This unit is constructed by removing the bottom of a utility tank. In place of the bottom which has been removed a deep-drawn stainless steel funnel is welded to the utility tank to form one piece. Holes are drilled through each of the two "Y"-shaped chute stems of the inner connectors of the funnel. In the holes, powder-dispensing motor pumps 43 and 44 are fixed to regulate the supply of a powdered material from the powder storage tank 42 into members 38 and 41, as the two "Y"-shaped chute stems of the inner connectors of the funnel are connected to each of the upper holes in members 38 and 41 respectively. The remaining hole at the lower end of member 41 leads into a conventional booster pump 45.

Member 45 is a booster pump identical to member 28. The outlet of this member 45 connects with a conventional filter press 46.

Member 46 which consists of a round pattern of iron for rapid filtration is identical to member 40. Pipes are connected to the brass discharge corks to join the inlet of a conventional sprinkler 47.

This sprinkler 47 is constructed of stainless steel and has a fan-shaped body. Small holes are drilled in the fan-shaped outlet plate to provide a fine mist spray. This sprinkler, which joins the end of a pipe from member 46, is held above a funnel-shaped mouth of a holding tank 48.

The holding tank 48 is constructed of wood, stainless steel, concrete cement, or a combination of these materials. The inlet of this tank is equipped with a wide, funnel-shaped mouth, which provides sufficient artificial aeration from the fine mist being sprayed from member 47 in the air of a germ-free room. Below this holding tank is an outlet nozzle which leads into a water needle valve 49 to regulate a desired outlet flow of liquid from the holding tank 48. The outlet of member 48 is connected to an inlet of a conventional high-pressure ion exchange demineralizer 50.

This ion exchange demineralizer consists of a self-contained ion-exchange unit for producing mineral-free water or other liquids of high ionic purity. It is capable of producing a large capacity of demineralized water or other liquids per hour at continuous operation. It is equipped with a built-in electric purity meter which indicates the ionic purity of a treated water or liquid. Its reservoir tower is made of transparent, inert plastic or of stainless steel. A scientifically blended mixed bed of ion exchange resins in a replaceable cartridge with filter pads is provided. This cartridge is held below the outlet flow of the reservoir tower. At the base of this cartridge water of ionic purity is collected in a tank. This tank is provided with an electric meter for direct reading of anions and cations and parts per million in the water, or liquid purity. Member 50 operates on 115/230 volts 50/60 cycles AC. The outlet of this ion exchange demineralizer 50 is connected by pipes to a water needle valve 51 which, in turn, is connected to a storage tank 52.

This conventional storage tank 52 is constructed of galvanized steel and is identical to member 27. The outlet of this member 52 is connected to a pipe which leads into an inlet of a conventional booster pump 53.

This booster pump 53 is identical to the motor of member 28. The outlet of this member is connected to a pipe for distribution.

Up to this point, the plugs of all the conventional electrical equipment in the present pilot plant 10 are connected to a live power outlet with the "ON-OFF" switches. Simultaneous elevating, milling, filling, sterilizing, decolorizing and filtering in the device can now be automated by conventional controllers 54–58.

These controllers consist of an assembly of all solid state design. They accept signals from level-sensing probes and amplify these minute signals to control a power relay within the controller. Pumps or motors, or both of these, operating at 115/230 volts 50/60 cycles AC are connected directly to the load receptacle of the controllers, and actuated by the power relay. The controllers are capable of controlling a wide range of aqueous solutions and mixtures during either the DRAINING or the FILLING cycle. A panel-mounted switch, labeled "DRAIN" or "FILL" provides instant selection of the desired operating method. Visual indication of the "ON/OFF" cycling of the pump or motor being controlled is furnished by a panel indicator light. Three sensing probes, consisting of Ground, High, and Low, are provided. The High and Low sensing probes are inserted into a tank and adjusted for the proper vertical position associated with the desired high and low liquid levels. The Ground probe must be adjusted so as to be always immersed in the liquid. The input cables are attached to the probes and connected to the automatic level control switch input receptacles. In the FILL position a controller keeps the flow of liquid in a tank to a HIGH sensing probe and then shuts off the pump. In the DRAIN position, the control keeps the draining of liquid from a tank to the Low sensing probe and also shuts off the pump.

The automatic controllers are connected to 115/230 volts AC 50/60 cycles power source and the power switches are set at the ON position. The level of the liquid within the tank will now be controlled within the range determined by the difference in vertical height between the HIGH and LOW sensing probes. This range may be adjusted at will and establishes the frequency of operation of pumps or motors in the present device.

Loads of a conveyor elevator 21, a mill 22, and a delivery pump 23 are connected to the load of a heavy-duty receptacle of a liquid level controller 54. Three sensing probes, High, Low, and Ground, are inserted into a blending container of a mill 22. The input cable is attached to the probes and connected to the control switch input receptacle of member 54. A plug of this controller is connected to 115/230 volts AC 50/60 cycles power source and the power switch set at the OFF position. A selector switch of the controller is set at the position labeled FILL.

On the other hand, loads of a centrifuge pump 24, booster pumps 28, 37, 39 and 45 are connected to the load receptacle of controllers 55–58 respectively. The sensing probes of a second controller 55 are inserted into a blending container of mill 22. The sensing probes of a controller 56 are also inserted into a carbon treating tank 38 while the fourth and fifth sensing probes of controllers 57 and 58 are inserted into carbon-treating tanks 38 and 41 respectively. The input cables of these controllers are attached to the probes and connected to each of the controllers' switch input receptacles of members 55–58 respectively. The plugs of these controllers are also connected to a 115/230 volts AC 50/60 cycle power source and the power switches set at a position labeled either for FILLING or DRAINING of individual tanks in the system.

The operation of the pilot plant 10 for the recovery of flour, sugar-base for concentrates, poultry feed, fertilizers, and organic and inorganic salts as well as fiber from plantain and plantain wastes as shown in the drawing will now be readily understood.

Bundles of plantain wastes, piles of plantain peels, together with pieces of broken fibers left after extracting pure fiber from plantain at a fiber-treating plant 59 are brought to a waste section of a receiving platform 20. The waste mass is loaded into conveyor elevator 19, and a power switch of member 19 is turned to the ON position. Member 19 carries and deposits the mass into a waste storage bin 18. A device 17 provided in the chute of member 18 regulates and conveys the mass into a retort boiler 16. Heaters provided in the retort boiler 16 heat the mass with an opening through a water-cooling condenser 12 only large enough to permit the escape of vapors. The material cannot burn, but some of its components are completely decomposed. Various volatile materials are given off which are condensed into liquid and collected in a collecting vessel 11 for the recovery of organic salts for the manufacture of drugs and other industrial materials.

An amorphous carbon which remains behind in the retort boiler 16 is removed through a lug door 15 and at the base 13 through a funnel 14. The amorphous carbon thus obtained is cooled to room temperature. It is then ground and ashed in a conventional dryer-furnace 35 at a high temperature. The pure white ash thus obtained is cooled and ground into a fine powder for use in the manufacture of perfumed soaps and other products.

Returning to the vegetable section of the receiving platform 20, a predetermined weight of peeled and thoroughly cleaned plantain vegetable in a germ-free room is loaded into a conveyor elevator 21. The load of the conveyor elevator 21, a motor of a mill 22, and a centrifuge pump 23 are electronically controlled by a controller 54. This controller's selector switch is kept at the FILLING position to shut off the above members. Thus, while the motor of the conveyor elevator 21 is transporting a vegetable mass into a blending container of member 22, rotating blades in the blending assembly engage the motor spindle of the mill 22 to produce a forceful flow of material into the rotating blades. At the same time, a delivery pump 23 will be filling the blending container with warm water. Immediately the level of the blending container rises to a preset High, the sensing probes of member 54 in the container, members 21, 22, and 23, are turned off automatically. Following this, a sensing probe of controller 55 inserted in member 22, and having its switch selector placed at the DRAIN position, controls a centrifuge pump 24 and a booster pump 28 respectively. Thus, at the completion of a filling cycle in member 22, the slurry in member 22 is drained into a separator 25 by a centrifuge pump 24. At the same time, a booster pump 28 will be draining a milky juice from a storage tank 27 into an agglutination vessel 29.

Meanwhile, by gravity, a slurry is drained into the separator 25, which separates small seeds from the slurry while a meal and a milky juice drain into a second separator 26. As the liquefied slurry enters a separator 26, the meal is retained here in a canister held in member 26, while with a free run the milky juice is draining into a storage tank 27 in a cold room. Thus the seeds as well as the meal trapped in members 25 and 26 are collected by lifting the canisters from the separators. The meal is pressed into cakes. The cakes are spread out and dried in the sun in a germ-free, glass-roofed room. The dried meal is ground into fine powder and packaged and preserved for use as edible flour.

The milky juice which is drained into a storage tank 27 in the cold room is pumped into an agglutination vessel 29 by a booster pump 28 which is controlled by member 55. As the juice enters into the agglutination vessel 29 a device 30 automatically supplies calcium carbonate, or a mixture of calcium carbonate and calcium hydroxide, solution from member 31 into the agglutination vessel 29. The mixture is vigorously stirred by a stirrer installed inside the vessel, while a heating mantle provided for the vessel warms the mixture. As soon as a gel is formed in the agglutination vessel, a needle valve 32 at the lower end of the vessel is opened. By gravity, the pulp is drained into the rack-and-cloth equipment 33. A free run of clear, light amber solution is drained directly into a high-pressure cooking vessel 36 for sterilization. Meanwhile, the gelled pulp in the rack-and-cloth equipment 33 is placed in a hydraulic press 34. A pressed pulp is dried in a glass-roofed room, or at a low temperature in the dryer-furnace 35. After drying and cooling the pulp, it is ground and packaged for use as poultry feed or fertilizers.

A sterilized solution from the pressure-cooking vessel 36 is drained into a carbon treating tank 38 by a booster pump 37 which is controlled by member 56 controller. Here, a device 43 automatically supplies an activated carbon from member 42 to member 38. As a solution from member 36 begins to fill the carbon treating tank, a stirrer fitted into the carbon treating tank vigorously stirs the mixture while a hot plate directly under the tank boils the mixture. When the mixture rises to the High sensing probe of controller 56, the motor of member 37 shuts off. Another controller 57 which controls a booster pump 39 drains a mixture from member 38 through a filter press 40 to fill a second carbon treating tank 41. This filtered solution also mixes with the activated carbon which is supplied by member 44. While a stirrer provided for this member vigorously stirs the mixture, a hot plate directly under the system boils the mixture. As the mixture rises to a preset high level of the sensing probe for draining, a booster pump 45, which is controlled by member 58 controller, directs the draining of the mixture by means of high pressure through a filter press 46. As the filtered solution passes through the filter press, a clear, fine mist of solution is sprayed by member 47 into an artificially aerated, wide mouth of a holding tank 48. An oxidized and deodorized solution collected into the holding tank is regulated through a needle valve 49 into an ion exchange demineralizer 50 by gravity. The solution is passed through the demineralizer until the desired pH of 4.2 is reached, and the natural corrosiveness, cations and anions are removed. The purified clear, sweet solution thus obtained is regulated by a needle valve 51 and the final product is stored in a cold room in a storage tank 52. This storage tank 52 is equipped with a booster pump 53 for dispensing the solution. For sugar concentrates, the purified sugar-base solution is evaporated to a smaller volume which can be crystallized, ground and packaged for use as sugar.

At the completion of the filtration, the residue and filters in the filter presses are removed and new ones inserted.

In obtaining a pure fiber from a porous sheath of plantain trunk or from a stock of the vegetable, the material is exposed to the sun to accelerate the process of fermentation. After the fiber is fermented, the green pigment of the vegetable stock is removed. The material is then beaten and retted to a finer texture. A crude fiber thus obtained is passed between rollers and anchored in a pool of water, washed, and dried on the farm. The dried fiber is bundled and brought to a fiber-treating plant 59–61 to be processed conventionally. At the plant, the fiber is kept in a submerged pool of the heating tank 59 which contains 1 percent solution of sodium hydroxide. The fiber is boiled to remove all the noncellulosic constituents of hemicelluloses, pectic compounds, lignone and cutose, to yield pure fiber. The resulting fiber is steeped in a tank 60 containing 18 to 25 percent solution of sodium hydroxide, at a temperature of 15° to 20° centigrade, for 2 days. By this time, the fiber is mercerized, or saturated with the sodium hydroxide. The fiber is then placed in a conventional kneading machine 61. This machine with saw-tooth edge comb combs the fiber under tension until it is dried. Such a process strengthens and gives the fiber a glossy, soft, strong and attractive texture. After purification and conventional bleaching finish, the fiber thus obtained in suitable by itself or in combination with other fibers for many cellulose industrial products.

It can now be recognized that substantially no pollution or toxic fumes are produced in the processing of plantain and plantain wastes, and that all units of this operation for the recovery of plantain are safely and conveniently arranged in a single, one-step operation.

While this work has been described with particular reference to the recovery of products from plantain and plantain wastes, as shown in the flow sheet, and as various changes can be made in the details of construction, it should be understood that such changes should be in the spirit and scope of the present work as defined by the appended claims.

Thus, having completely and fully described the work, what is now claimed to be new and which it is desired to be protected by Letters Patent of the United States are the following:

1. Method of producing valuable products from plantain, which comprises subjecting the sheath and the vegetable of plantain to fermentation, separating the fiber from the thus fermented material so as to obtain a crude fiber and a remaining sheath and vegetable stock, washing and drying the thus obtained crude fiber so as to obtain a semipurified fiber as a first recovery product, separating the remaining sheath from the vegetable stock, subjecting the thus separated remaining sheath to destructive steam distillation and condensing the vapors from said distillation, thus obtaining amorphous carbon as a residue of recovery product and a liquid containing various salts, recovering the salts from said liquid as a third recovery product, blending the remaining vegetable stock with warm water so as to form a slurry thereof, separating said slurry into a solid meal and a milky liquid, pressing said meal into cakes, drying said cakes and grinding the same into a powder that can be used as an edible flour and serves as a fourth recovery product, treating said milky liquid with an agglutination agent selected from the group consisting of calcium carbonate and a mixture of calcium carbonate and calcium hydroxide, thereby forming a pulp-containing gel, separating the pulp from the liquid, drying the pulp, and grinding the thus dried pulp into a powder which can be used as a poultry feed and as fertilizer, and which serves as a fifth recovery product.

\* \* \* \* \*